United States Patent
Ryonai et al.

(10) Patent No.: US 6,242,085 B1
(45) Date of Patent: Jun. 5, 2001

(54) MAGNETIC RECORDING MEDIUM AND METHOD FOR PRODUCING THE SAME

(75) Inventors: Hiroshi Ryonai; Tatsuaki Ishida; Kiyokazu Tohma; Keizou Miyata; Taizou Hamada, all of Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/153,579

(22) Filed: Sep. 15, 1998

(30) Foreign Application Priority Data

Sep. 17, 1997 (JP) .................................................. 9-251997

(51) Int. Cl.⁷ ......................................................... G11B 5/66
(52) U.S. Cl. ...................... 428/332; 428/336; 428/694 T; 428/694 TS; 428/694 TR; 428/900; 204/192.22; 204/192.23; 204/192.15; 204/192.2; 204/298.12; 204/298.13
(58) Field of Search ........................ 428/694 T, 694 TS, 428/694 TR, 900, 332, 336; 204/192.22, 197.23, 197.15, 197.2, 298.12, 298.13

(56) References Cited

U.S. PATENT DOCUMENTS

| | | | | |
|---|---|---|---|---|
| 5,462,809 | * | 10/1995 | Berkowitz | 428/546 |
| 5,652,054 | * | 7/1997 | Kikitsu | 428/328 |
| 5,658,659 | * | 8/1997 | Chen | 428/332 |
| 5,658,680 | | 8/1997 | Shimizu et al. | 428/694 T |
| 5,789,088 | * | 8/1998 | Nakai | 428/611 |
| 5,879,783 | * | 3/1999 | Chang | 428/141 |
| 5,895,727 | * | 4/1999 | Hasegawa | 428/682 |

FOREIGN PATENT DOCUMENTS

| | | |
|---|---|---|
| 5-93270 | 4/1993 | (JP) . |
| 7-141638 | 6/1995 | (JP) . |
| 9-67141 | 3/1997 | (JP) . |

OTHER PUBLICATIONS

Ichihara, K., et al. "Low noise CoPt–SiO$_2$ granular media", 20th Japan Applied Magnetism Society, 1996, p. 195.

* cited by examiner

Primary Examiner—Leszek Kiliman
(74) Attorney, Agent, or Firm—Merchant & Gould P.C.

(57) ABSTRACT

An underlying layer is formed of Cr or the like on a glass substrate, and a magnetic layer is formed on the underlying layer by simultaneously sputtering a magnetic substance and a non-magnetic substance that does not form a solid solution with the magnetic substance in an atmosphere having a pressure of 30 mTorr to 75 mTorr. The magnetic recording medium comprises clusters, each of which is formed of aggregated magnetic grains, and a non-magnetic substance between the clusters. Each magnetic grain has a grain diameter of 5 nm to 20 nm. An average gap between the clusters is 1.5 nm to 5 nm. Thus, the present invention can provide a magnetic recording medium having a high S/N ratio that is suitable for high density recording.

16 Claims, 14 Drawing Sheets

MAGNETIC RECORDING MEDIUM AND METHOD FOR PRODUCING THE SAME

BACKGROUND OF THE INVENTION

1. Field of the Invention

The present invention relates to a magnetic recording medium for use in a magnetic recording/reproducing device having large capacity and high recording density, and a method for producing such a magnetic recording medium.

2. Description of the Prior Art

There is a tendency in a magnetic recording/reproducing device toward high density recording in order to achieve large capacity with a compact size. In the field of a hard disk drive, which is a typical magnetic recording device, a device having a recording density per unit of area (surface recording density) more than 1 Gbit/in$^2$ has been already commercially available. It is expected to see a technological advancement so rapid that a device with 10 Gbit/in$^2$ will be commercially practical in a few years.

An improvement in medium performance and head-disk interface performance, and an enhancement in a linear recording density resulting from the advent of new signal processing techniques such as partial response have allowed such high density recording. Recently, however, a tendency toward higher track density is greater than a tendency toward higher linear recording density, and this constitutes a main factor for the improvement in the surface recording density. This tendency is caused by the fact that a magneto-resistive type head (MR head) having more excellent reproducing output performance than that of a conventional induction type magnetic head has been put into practical use. At present, the magneto-resistive head allows signals in a track width as small as several gm to be reproduced in a good SIN ratio. In the near future, the head performance will further improve, and a track pitch will be in a sub-micron region.

When an MR head is used to reproduce signals, the signals to be reproduced are more affected by noise stemming from a recording medium, as compared to a conventional induction type magnetic head. For this reason, it is more important to reduce medium noise. In order to reduce noise, it is effective to minimize crystal grains in a magnetic layer and to isolate magnetic grains.

Conventionally, it is known to perform sputtering, for example, a CoCrPt based magnetic layer at a substrate temperature as high as 300° C. or more, in order to facilitate the isolation of magnetic grains. This method allows atoms sputtered onto a substrate to move easily on the substrate. As a result, a magnetic layer is formed comprising CoPt based magnetic crystal grains and Cr-rich non-magnetic substances at grain boundaries between the magnetic crystal grains. The formation of the non-magnetic substances at the grain boundaries facilitates the isolation of the magnetic crystal grains.

However, according to the method of heating the substrate so as to facilitate the movement of Cr to the grain boundaries, the atoms that have reached the substrate can move readily so that the magnetic crystal grains become large. Thus, it is difficult to make the crystal grains smaller. A large size of crystal grains is detrimental to a decrease in medium noise.

SUMMARY OF THE INVENTION

Therefore, with the foregoing in mind, it is the object of the present invention to provide a magnetic recording medium having low medium noise and being suitable for high density recording, and a method for producing the same.

In order to achieve the object, a magnetic recording medium of the present invention comprises a non-magnetic substrate, an underlying layer formed on the non-magnetic substrate and a magnetic layer formed on the underlying layer. The magnetic layer comprises clusters, each of which is formed of aggregated magnetic grains, and a non-magnetic substance between the clusters. Each magnetic grain has a grain diameter of 5 nm to 20 nm (preferably 8 nm to 10 nm). The average gap between the clusters is 1.5 nm to 5 nm.

In this magnetic recording medium, clusters of aggregated magnetic grains having small diameters are dispersed and isolated by the non-magnetic substance, thereby obtaining a magnetic recording medium having low medium noise and a high S/N ratio. In the specification of the present invention, "average gap between clusters" means an average value of the shortest distances between adjacent clusters.

This magnetic recording medium can be obtained by the following method. Namely, a method for producing a magnetic recording medium of the present invention comprises the steps of forming an underlying layer on a non-magnetic substrate and forming a magnetic layer on the underlying layer. The magnetic layer can be formed by simultaneously sputtering a magnetic substance and a non-magnetic substance that does not form a solid solution with the magnetic substance in an atmosphere having a pressure of 30 mTorr to 75 mTorr.

When a magnetic substance and a non-magnetic substance that do not form a solid solution are sputtered simultaneously in an atmosphere having a relatively high pressure, clusters in which fine magnetic grains are aggregated are formed, and the isolation of the clusters from each other is facilitated.

According to the present invention, a magnetic layer formed on a non-magnetic substrate and an underlying layer comprises clusters of aggregated magnetic grains having a grain diameter of 5 nm to 20 nm and a non-magnetic substance between the clusters. Furthermore, an average gap between the clusters is 1.5 nm to 5 nm. Therefore, the present invention can provide a magnetic recording medium having low noise and a high S/N ratio, which is suitable for high density recording. This magnetic recording medium can be formed efficiently by simultaneously sputtering a magnetic substance and a non-magnetic substance that does not form a solid solution with the magnetic substance in an atmosphere having a pressure of 30 mTorr to 75 mTorr, in the step of forming the magnetic layer on an underlying layer formed on a non-magnetic substrate.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of preferred embodiments with reference to the accompanying drawings.

Figure 1:
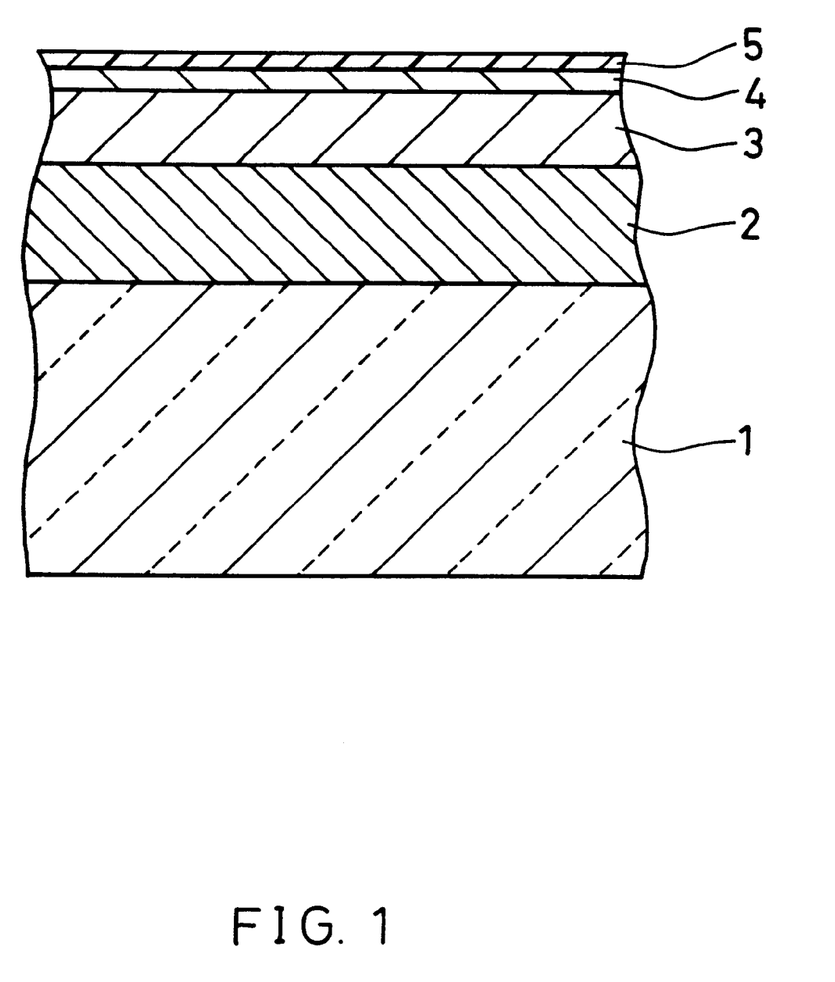
FIG. 1 is a cross-sectional view showing one embodiment of a magnetic recording medium of the present invention.

FIG. 1 is a cross-sectional view of one embodiment of a magnetic recording medium of the present invention. As shown in FIG. 1, the magnetic recording medium includes a glass substrate 1, an underlying layer 2, a magnetic layer 3, a protective layer 4 and a lubricant layer 5. These layers are formed on the glass substrate 1 in this order. The lubricant layer 5 is formed by coating the protective layer 4 with a lubricant. The glass substrate is formed of glass such as aluminosilicate glass. The underlying layer 2 is formed of a non-magnetic substance including NiAl, Cr or the like, but Cr or a Cr alloy can be preferably used. The protective layer 4 is formed of, for example, carbon. The glass substrate 1, the underlying layer 2, the protective layer 4 and the lubricant layer 5 can be formed of various materials as long as the object of the present invention can be achieved. The thickness of the underlying layer is not particularly limited, but preferably is 50 nm to 200 nm.

Figure 2:
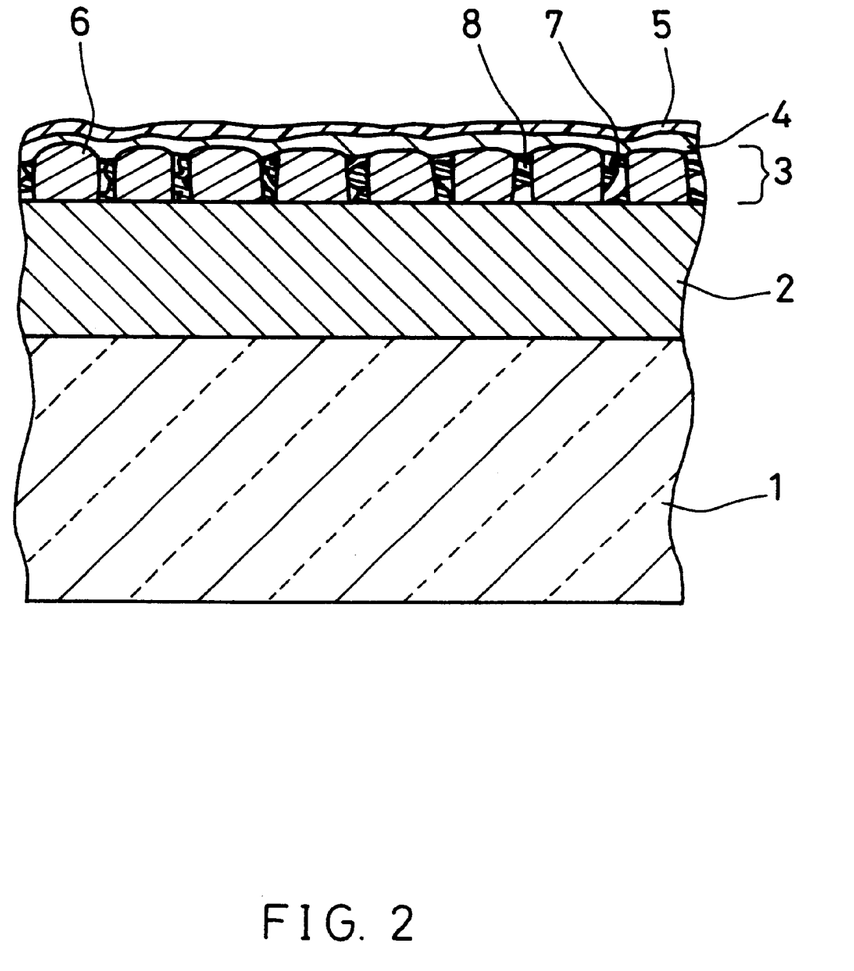
FIG. 2 is a cross-sectional view schematically showing the structure of a magnetic layer in the magnetic recording medium shown in FIG. 1.

Hereinafter, the magnetic layer 3 will be described. The magnetic layer 3 comprises magnetic grain clusters 6 and grain boundary substances 7 between the clusters. As shown in FIG. 2, preferably, the grain boundary substances 7 are not packed densely at the grain boundaries between the clusters, but voids 8 are preferably present between the grain boundary substances 7. This structure can be formed by setting the pressure in the atmosphere for sputtering at a relatively higher pressure, as described later.

An individual cluster 6 has an average diameter of, for example, 20 nm to 50 nm, and the clusters are dispersed in the magnetic layer 3 so as to be spaced apart from each other with an average gap of 1.5 nm to 5 nm. Although the cluster 6 is shown as one grain in FIG. 2, the cluster 6 is actually an aggregate of fine magnetic grains. Each of the magnetic grains constituting the cluster has a grain diameter of 5 nm to 20 nm, preferably 8 nm to 10 nm. The magnetic grains constituting the cluster are aggregated densely (e.g., with a gap of about 1 nm). The thickness of the magnetic layer is not particularly limited, but preferably is 20 nm or less.

The material constituting the magnetic grain is not particularly limited, but a CoPt based alloy can be used preferably. The grain boundary substance is formed of a non-magnetic substance. The non-magnetic substance preferably includes at least one metal compound (metal oxide and/or metal nitride) selected from the group consisting of silicon oxide, aluminum oxide, cobalt oxide, titanium oxide, chromium oxide, magnesium oxide, tantalum oxide, silicon nitride, aluminum nitride, titanium nitride and chromium nitride.

In the magnetic layer, the metal component of the metal compound constituting the non-magnetic substance is preferably included at 5 to 12.5 atomic % with respect to the total amount of the metal component constituting the magnetic substance and the metal component constituting the non-magnetic substance. An amount in this range can provide good electromagnetic conversion characteristics.

Figure 4:
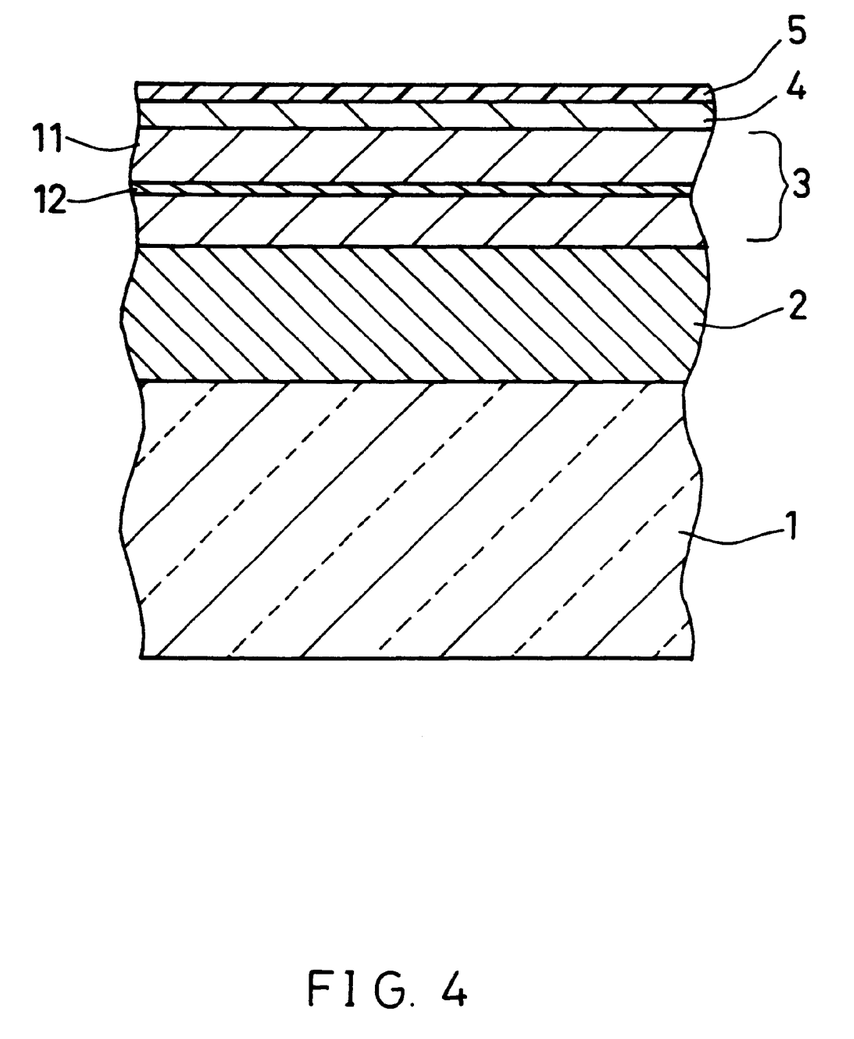
FIG. 4 is a cross-sectional view showing one embodiment of a magnetic recording medium of the present invention, which is a magnetic layer having a multi-layered structure.

The magnetic layer 3 is not necessarily formed of a single layer, but may be a multilayer comprising magnetic thin films 11 including the clusters and the non-magnetic substance between the clusters, and a non-magnetic thin film 12, as shown in FIG. 4. This multi-layered structure further can reduce medium noise. In this case, the thickness of the non-magnetic thin film 12 is preferably 1 to 5 nm. The thickness of the entire magnetic layer is preferably 20 nm or less, as in the case of a single layer. The non-magnetic thin film in this case can be formed of Cr or a Cr alloy (e.g., CrV, CrMo).

The magnetic recording medium of the present invention can be provide with good characteristics without employing a so-called zone texture. Since a smaller floating distance between the recording head and the medium is better to realize high density recording, the surface roughness of a disk substrate in a hard disk device has been suppressed to about 0.5 nm or less. However, when the surface is smooth, the recording head adheres to the magnetic disk at the time of contact start stop (CSS) of the head. Therefore, the magnetic disk is textured so that a portion on the surface of the magnetic disk is rough (zone texture). In general, when the entire surface of the disk is made rough, the floating distance between the recording head and the medium becomes large, thereby degrading the electromagnetic conversion characteristics. However, since the magnetic recording medium of the present invention is provided with good electromagnetic conversion characteristics, the degradation in the electromagnetic conversion characteristics due to roughness on the entire surface of the medium can be compensated. For example, when the magnetic recording medium is formed by using a glass substrate having a surface roughness of 1 nm to 1.6 nm, it is possible to realize high density recording without taking a measure to prevent head adhesion, such as zone texture.

The surface roughness (Ra) in this specification is determined in accordance with the description in JIS B0601, which is incorporated herein by reference.

The magnetic recording medium of the present invention can be formed by a sputtering method, as conventionally performed. In the sputtering method, the magnetic layer 3 having the above-described structure is formed by sputtering a magnetic substance and a non-magnetic substance simultaneously under an atmosphere having a relatively high pressure (preferably a gas pressure of 30 mTorr to 75 mTorr). The magnetic substance and the non-magnetic substance may be prepared as separate targets.

Alternatively, a mixture of the magnetic substance and the non-magnetic substance may be prepared as a target.

Figure 3:
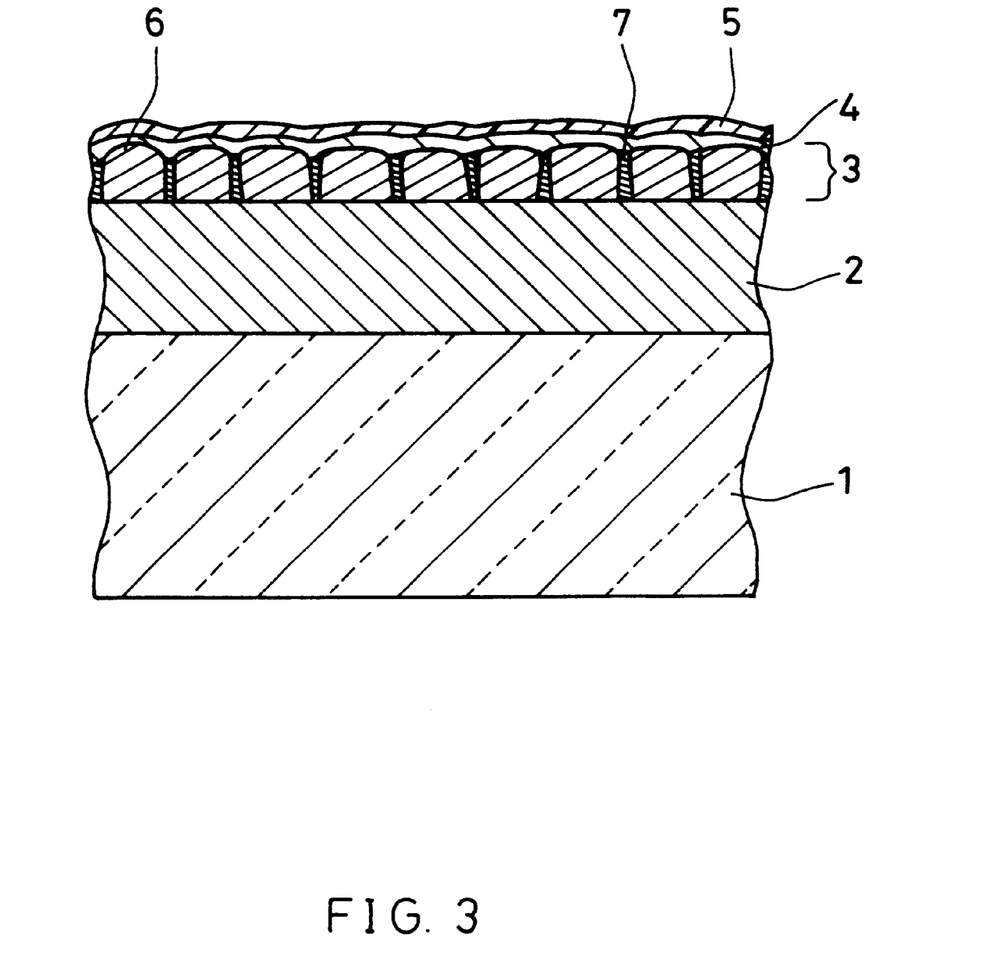
FIG. 3 is a cross-sectional view schematically showing the structure of a magnetic layer in the magnetic recording medium of FIG. 1 that has been formed at a lower gas pressure than that for the magnetic layer of FIG. 2.

The gas pressure for sputtering to form the magnetic layer does affect the structure of the magnetic layer, especially the structure between clusters of magnetic grains. It is likely that a smaller gas pressure results in smaller voids between clusters. For example, when a magnetic layer is formed at a smaller gas pressure than that for the magnetic layer shown in FIG. 2, the non-magnetic substances in the magnetic layer are packed between the clusters 6, as schematically shown in FIG. 3. The magnetic layer shown in FIG. 3 has a narrower gap between the clusters and a smaller extent of isolation of the clusters than those of the magnetic layer shown in FIG. 2.

In order to isolate the clusters sufficiently, the gas pressure is preferably 30 mTorr or more. On the other hand, when the gas pressure is excessively large, the obtained magnetic layer has sparse clusters, so that the contact with the head at the time of CSS may damage the magnetic medium. Therefore, the gas pressure is preferably 30 mTorr to 75 mTorr.

Furthermore, the magnetic layer is formed at a substrate temperature of 200° C. or less. A substrate temperature over 200° C. allows the magnetic grains or eventually the clusters to join with each other. This constitutes a detriment to achieving low medium noise.

EXAMPLE

Hereinafter, the present invention will be more specifically described by way of an example, but the present invention is not limited thereto.

A disk-shaped glass substrate having a diameter of 2.5 inch was placed in an in-line sputtering apparatus. The apparatus was evacuated to reach a vacuum of $10_6^-$Torr order. Then, baking was performed at 350° C. for 30 minutes in order to remove gas molecules or the like adhering to the surface of the substrate. After baking, the substrate temperature was lowered by cooling to room temperature (about 25° C., which applies to the following). The degree of vacuum after cooling was $5 \times 10_7^-$Torr.

A Cr layer was formed as an underlying layer on the glass substrate to a thickness of 100 nm in the in-line sputtering apparatus. Then, a magnetic layer was formed on the Cr layer at a predetermined substrate temperature and a predetermined gas pressure so as to have a thickness of about 15 nm. As the sputtering target for forming the magnetic layer, a CoPt target with a suitable amount of $SiO_2$ chips arranged thereon was used. The amount of the $SiO_2$ chips was determined so that the amount of Si atoms in the magnetic layer was 10% with respect to the total amount of Co atoms, Pt atoms, and Si atoms. The amount of each metal atom was measured by ICP Emission Spectroscopy.

Furthermore, a carbon layer was formed as a protective layer on the magnetic layer by sputtering so as to have a thickness of about 10 nm. The carbon layer was coated with a lubricant. The above-described layers produced by sputtering were formed in an inert atmosphere with argon (Ar).

The saturation magnetization (Ms δ) of the thus produced magnetic disk was about 1 memu/cm$^2$.

The gas pressure and the substrate temperature significantly affect the characteristics of the magnetic recording medium. In the above-described method, first, magnetic layers were formed at various Ar gas pressures between 10 to 100 mTorr, and the correlation with the electromagnetic conversion characteristics was investigated. At this time, the substrate temperature was room temperature (about 25° C.).

Figure 5:
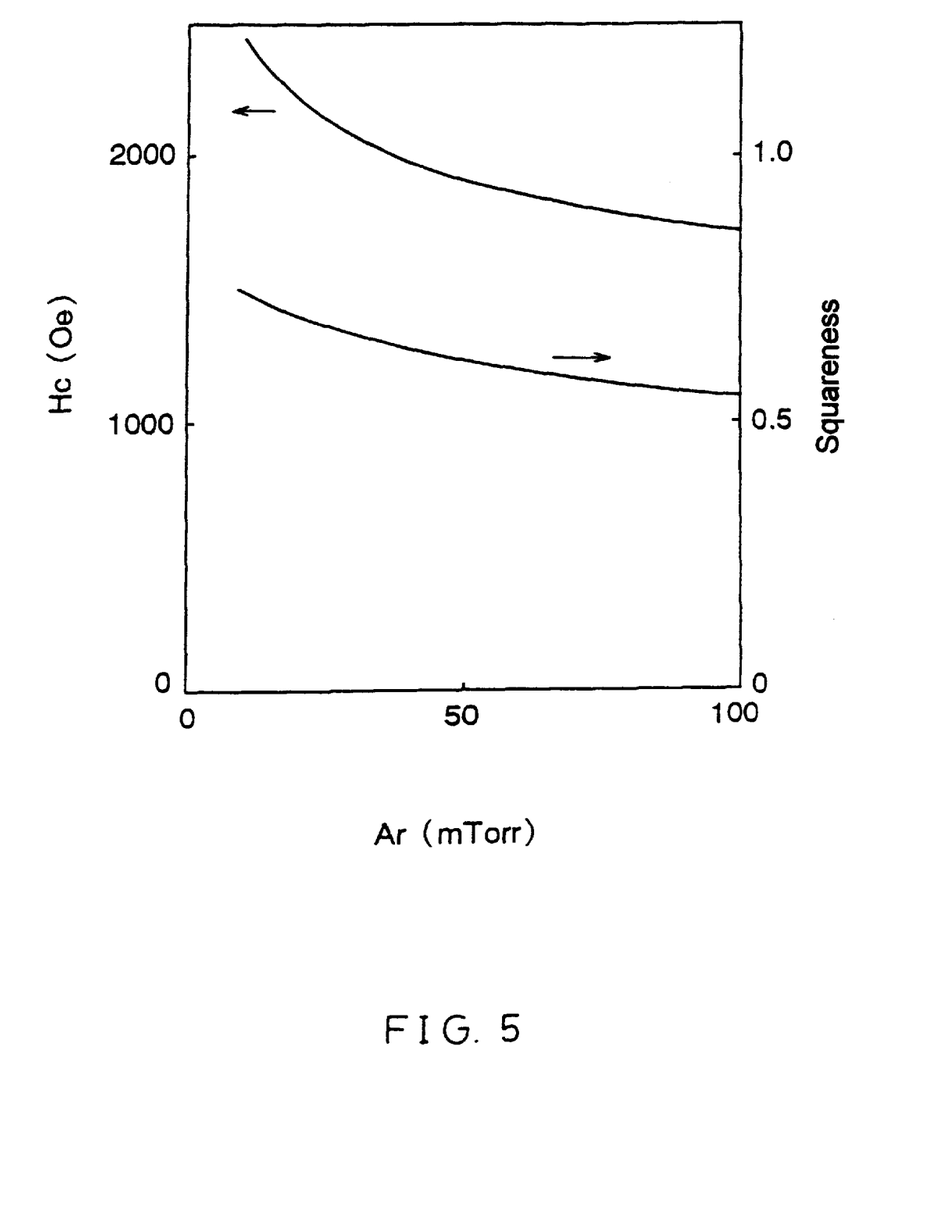
FIG. 5 is a graph showing the relationship between an Ar gas pressure and a medium coercivity (Hc) and a squareness when a magnetic layer is formed by sputtering.
Figure 6:
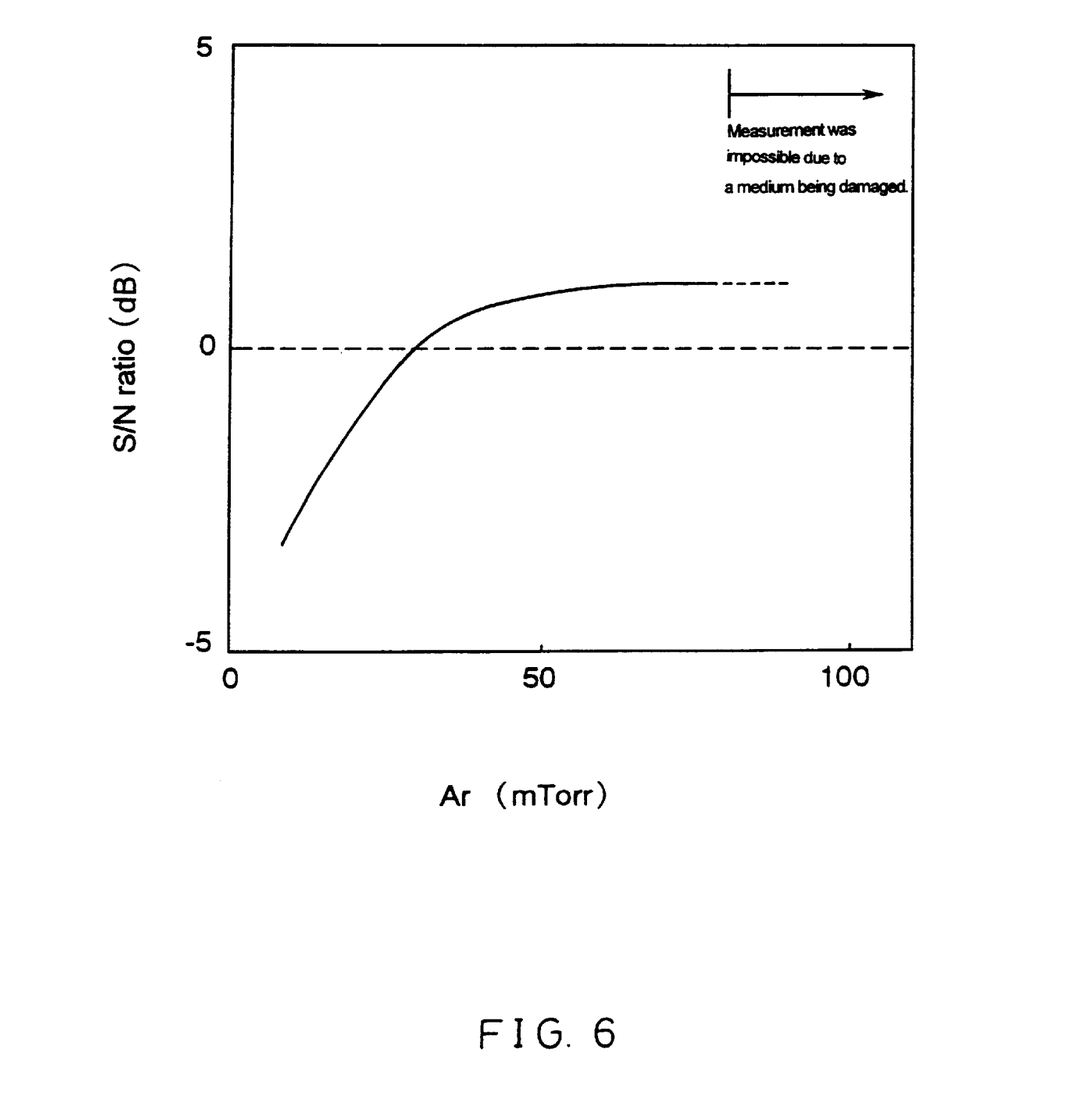
FIG. 6 is a graph showing the relationship between an Ar gas pressure and an electromagnetic conversion characteristic (S/N ratio) when a magnetic layer is formed by sputtering.

As shown in FIG. 5, when the Ar gas pressure was raised from 10 mTorr, the coercivity and the squareness were reduced. The reduction in the squareness is one phenomenon indicating that the isolation of magnetic grains is promoted. Furthermore, as shown in FIG. 6, as the Ar gas pressure was raised, the medium noise was reduced and the S/N ratio was improved. When the Ar gas pressure was less than 30 mTorr, the S/N ratio decreased significantly. On the other hand, when the Ar gas pressure exceeded 75 mTorr, the clusters in the magnetic layer itself were so sparse that the medium was damaged at the time of CCS by the head. Furthermore, as shown in FIG. 6, when the gas pressure was about 40 mTorr or less, the S/N ratio decreased sharply. Therefore, the gas pressure is preferably 30 mTorr to 75 mTorr, more preferably 40 mTorr to 75 mTorr.

The SIN ratio and the noise in this example are the results of a relative evaluation by setting a predetermined target value as 0. In this example, the magnetic characteristics were evaluated by a vibration sample magnetometer (VSM), and the electromagnetic conversion characteristics were evaluated at 120 kfci (kilo flux changes per inch).

Figure 7:
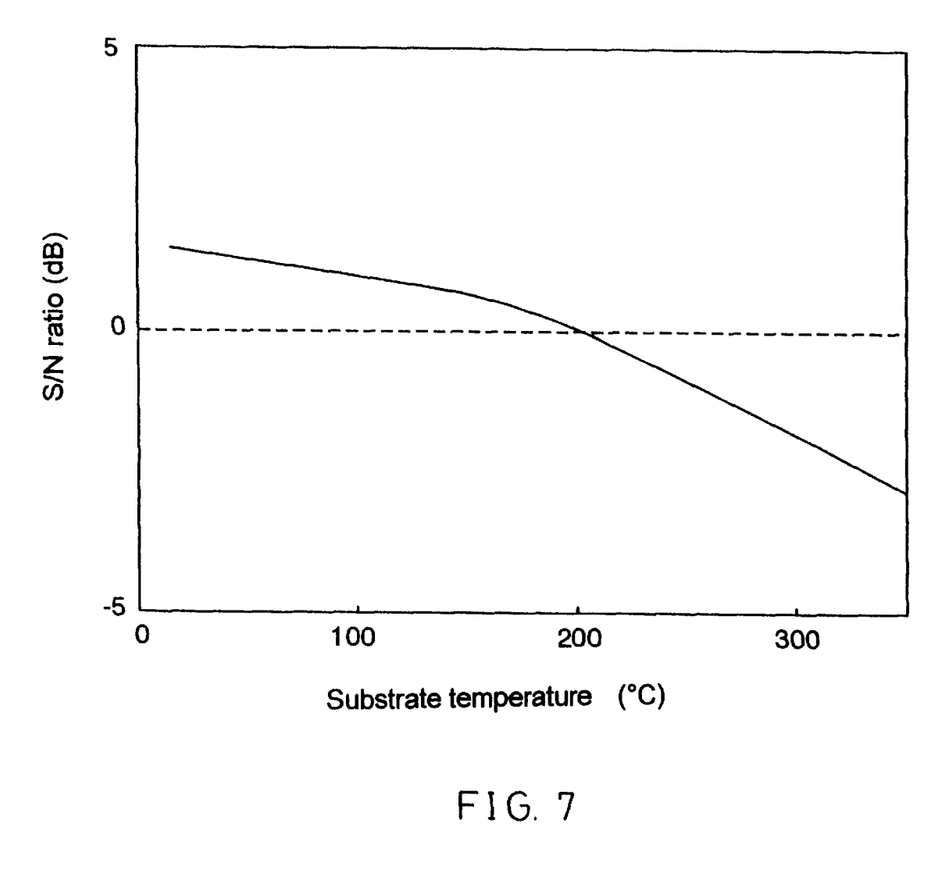
FIG. 7 is a graph showing the relationship between a substrate temperature and an electromagnetic conversion characteristic (S/N ratio) when a magnetic layer is formed by sputtering.

Next, the effect of the substrate temperature was investigated. In the above-described method, the gas pressure was set at 50 mTorr, and the substrate temperature was set at room temperature, 150° C., 200° C., 300° C. or 350° C. As a result, the S/N ratio of the obtained disk decreased monotonically as the substrate temperature was raised, as shown in FIG. 7. The reason for this is believed to be as follows. As the substrate temperature is raised, the growth of the magnetic crystals is accelerated and thus the contact of the crystals is facilitated. As a result, the medium noise increases. Therefore, the substrate temperature for formation of the magnetic layer is preferably 200° C. or less.

Figure 8:
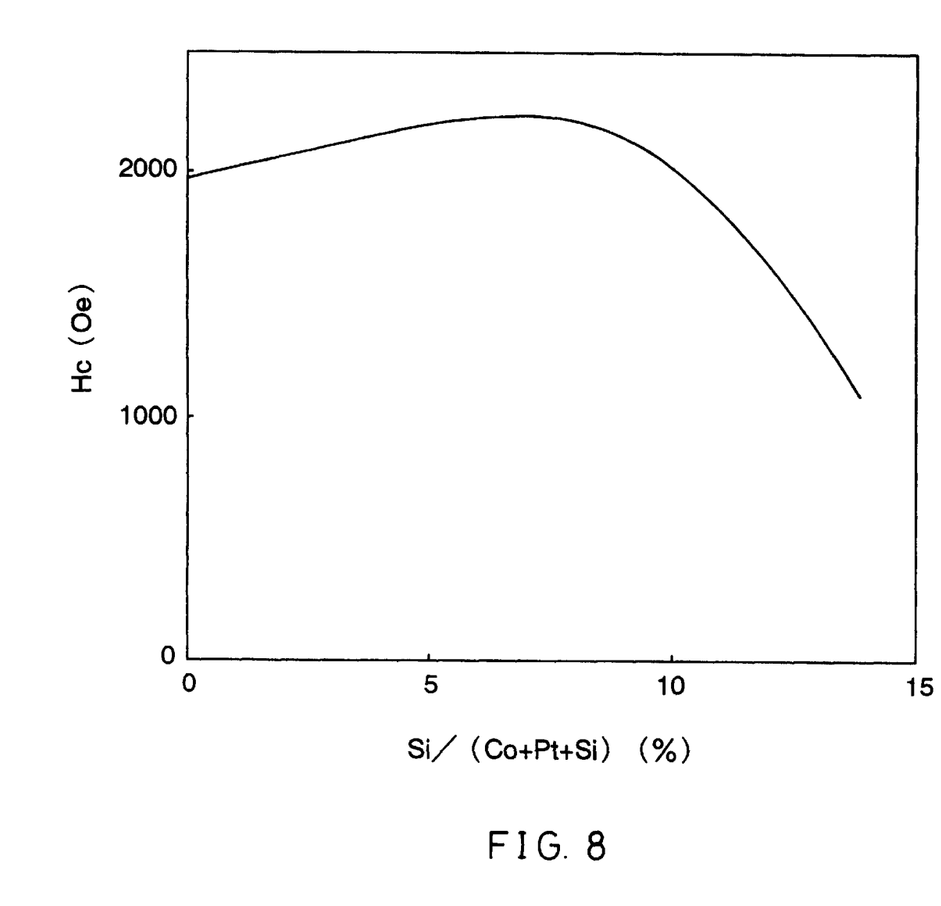
FIG. 8 is a graph showing the relationship between an amount of Si in a magnetic layer and a medium coercivity.

Furthermore, the effect of the component of the magnetic layer was investigated. Various disks were produced in the same manner as above except that the amount of $SiO_2$ chips on the CoPt target was varied in the step of forming the magnetic layer in the above-described method. At this time, the Ar gas pressure was 50 mTorr, and the substrate temperature was room temperature (about 25° C). As shown in FIG. 8, the coercivity (Hc) increased gradually as the ratio of Si atoms in the magnetic layer (Si/(Co+Pt +Si)) increased. However, after the ratio of Si atoms reached about 9%, the coercivity decreased. On the other hand, the medium noise decreased as the ratio of Si atoms increased, as shown in FIG. 9.

Figure 9:
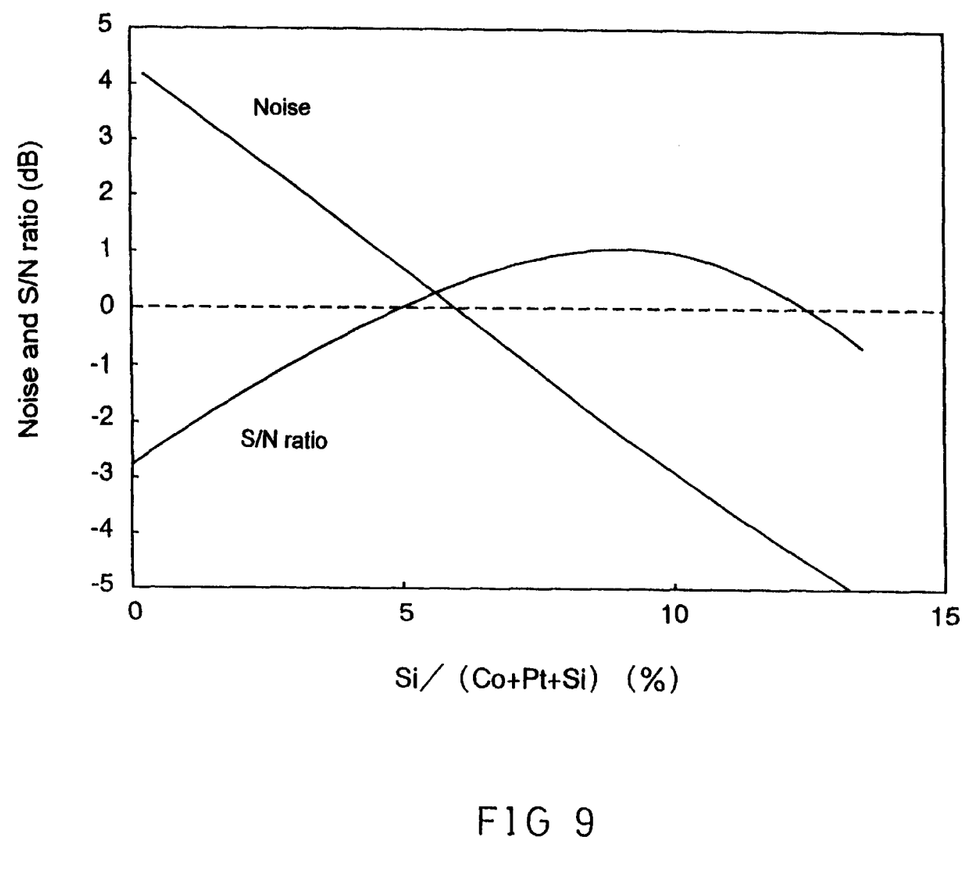
FIG. 9 is a graph showing the relationship between an amount of Si in a magnetic layer and electromagnetic conversion characteristics (noise and S/N ratio).

As seen from FIGS. 8 and 9, when the Si amount is less than 5 at. %, the coercivity is 2000 Oe or more, but a sufficient S/N ratio cannot be obtained. On the other hand, when the Si amount exceeds 12.5 at. %, neither the coercivity nor the S/N ratio is satisfactory. Therefore, the Si amount (amount of the metal in the non-magnetic substance) in the magnetic layer is 5 to 12.5 at. % with respect to the amount of the metal in the magnetic layer (the total of the metal amount of the non-magnetic substance and the metal amount of the magnetic grains).

It is believed that Si also serves to suppress grain growth of the magnetic grains, and thus contributes to suppress the grain diameter of the magnetic grain.

Figure 10:
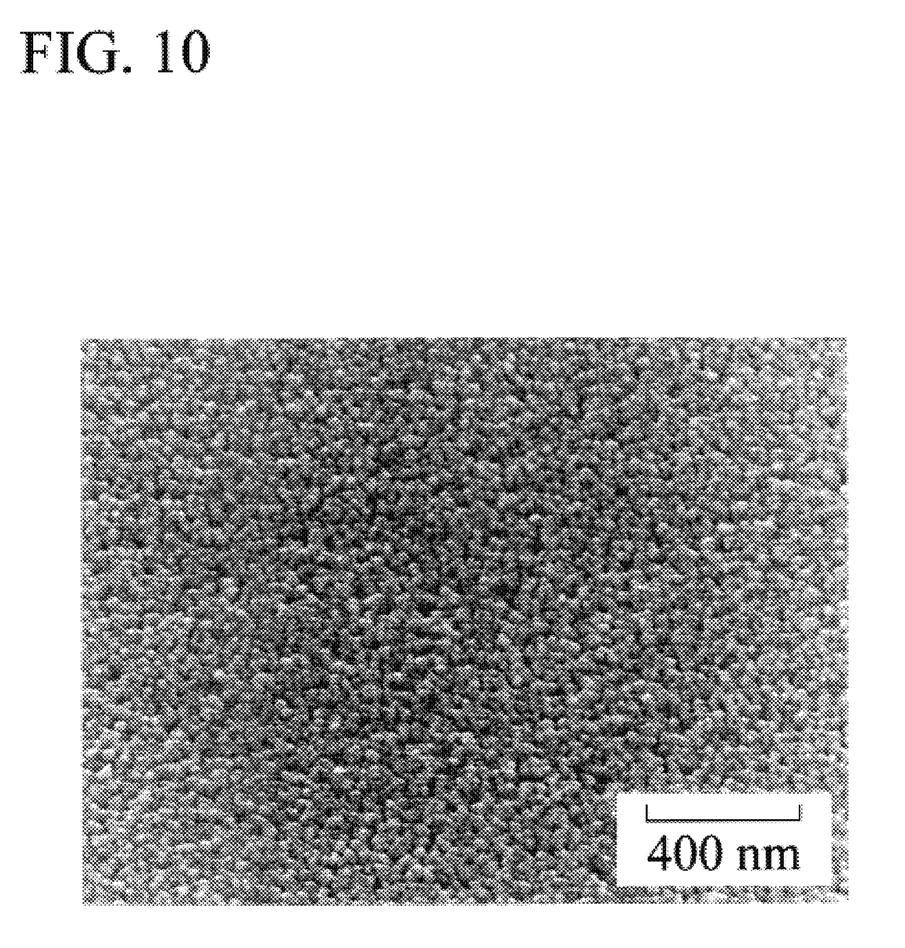
FIG. 10 is a scanning electron microscope (SEM) micrograph showing an example of a magnetic layer of the present invention.
Figure 11:
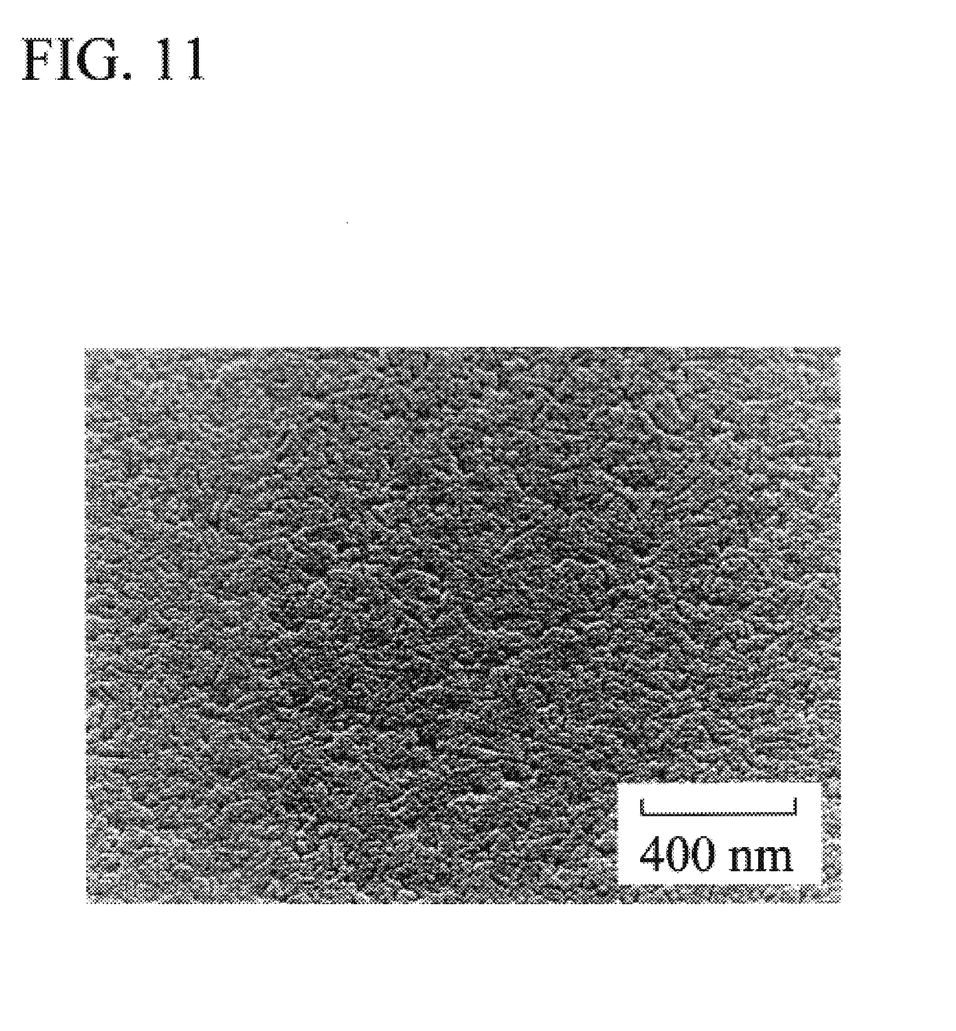
FIG. 11 is a SEM micrograph showing a magnetic layer formed in the same manner as the magnetic layer shown in FIG. 10 except that a non-magnetic substance is not sputtered.
Figure 12:
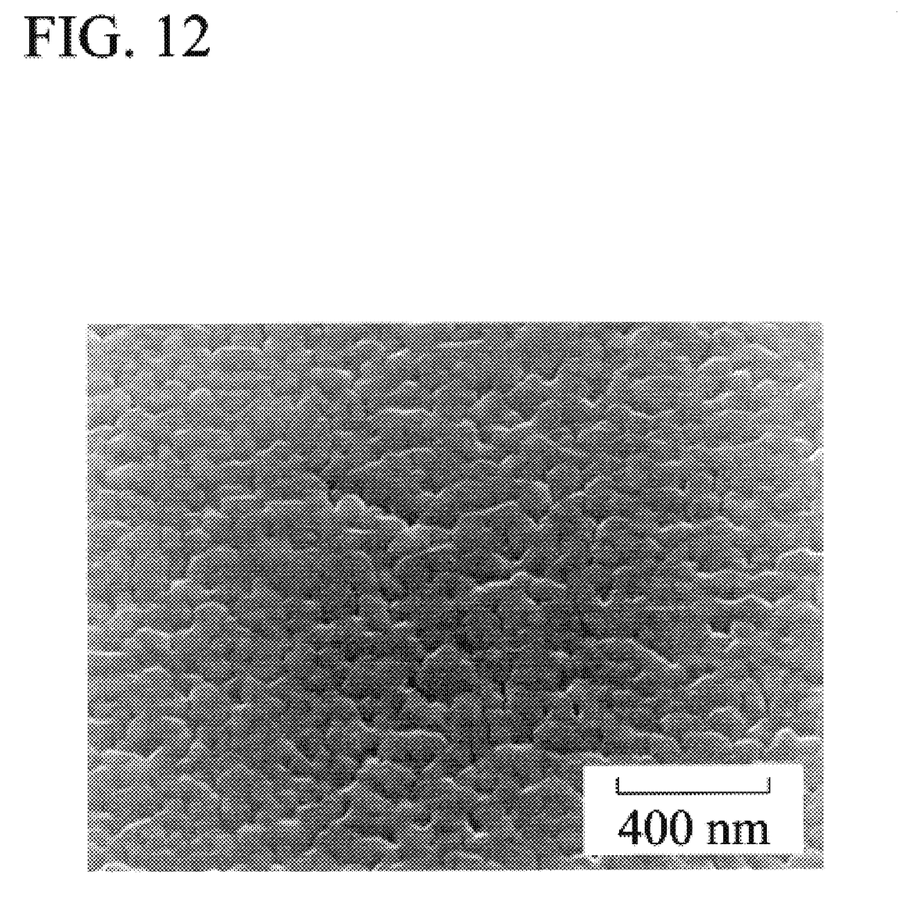
FIG. 12 is a SEM micrograph showing a magnetic layer formed in the same manner as the magnetic layer shown in FIG. 10 except that it is formed at a high substrate temperature (300° C.).

FIGS. 10 to 12 are scanning electron microscope (SEM) micrographs of magnetic layers. FIG. 10 is a micrograph of a magnetic layer produced at a substrate temperature of room temperature (about 25° C), at an Ar pressure of 50 mTorr, and in an Si amount of 10 at. %. FIG. 11 is a micrograph of a magnetic layer produced under the same conditions as the magnetic layer of FIG. 10 except that the Si amount was 0 at. %. FIG. 12 is a micrograph of a magnetic layer produced under the same conditions as the magnetic layer of FIG. 10 except that the substrate temperature was 300° C.

The comparison between FIGS. 10 and 11 confirms that simultaneous sputtering of $SiO_2$ as the non-magnetic substance allows individual magnetic substances to be isolated distinctly. Thus, the non-magnetic substance such as $SiO_2$ serves to facilitate the isolation of the magnetic substances. On the other hand, as seen from FIG. 12, an excessively high substrate temperature results in the magnetic grains partially joining with each other, thereby increasing the grain diameter of the magnetic substance.

Figure 13:
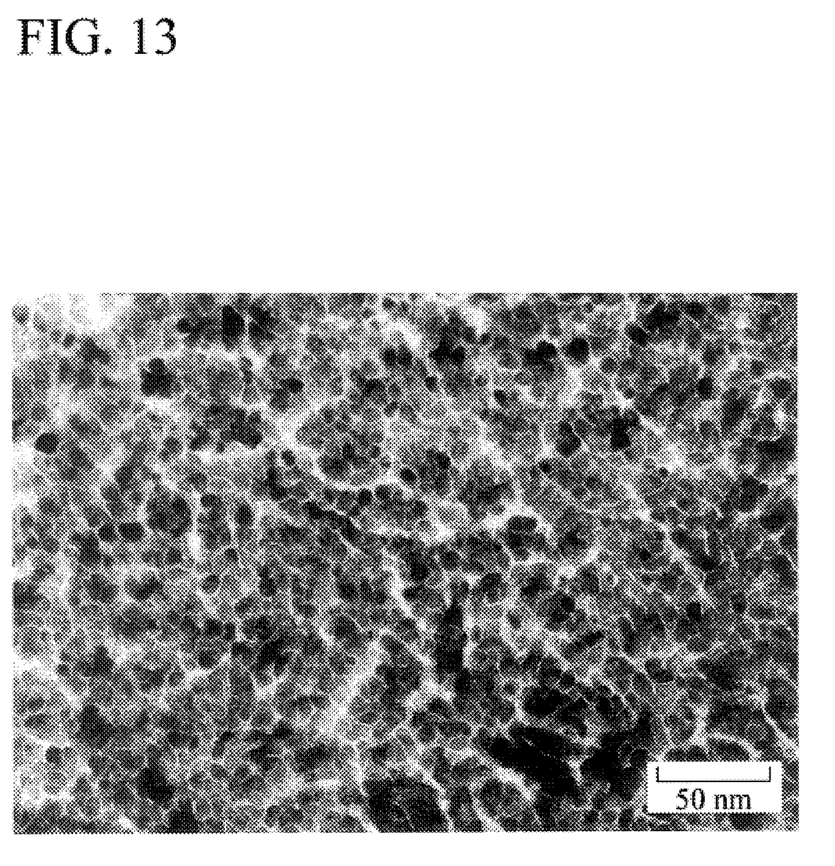
FIG. 13 is a transmission electron microscope (TEM) micrograph showing an example of magnetic layer of the present invention.
Figure 14:
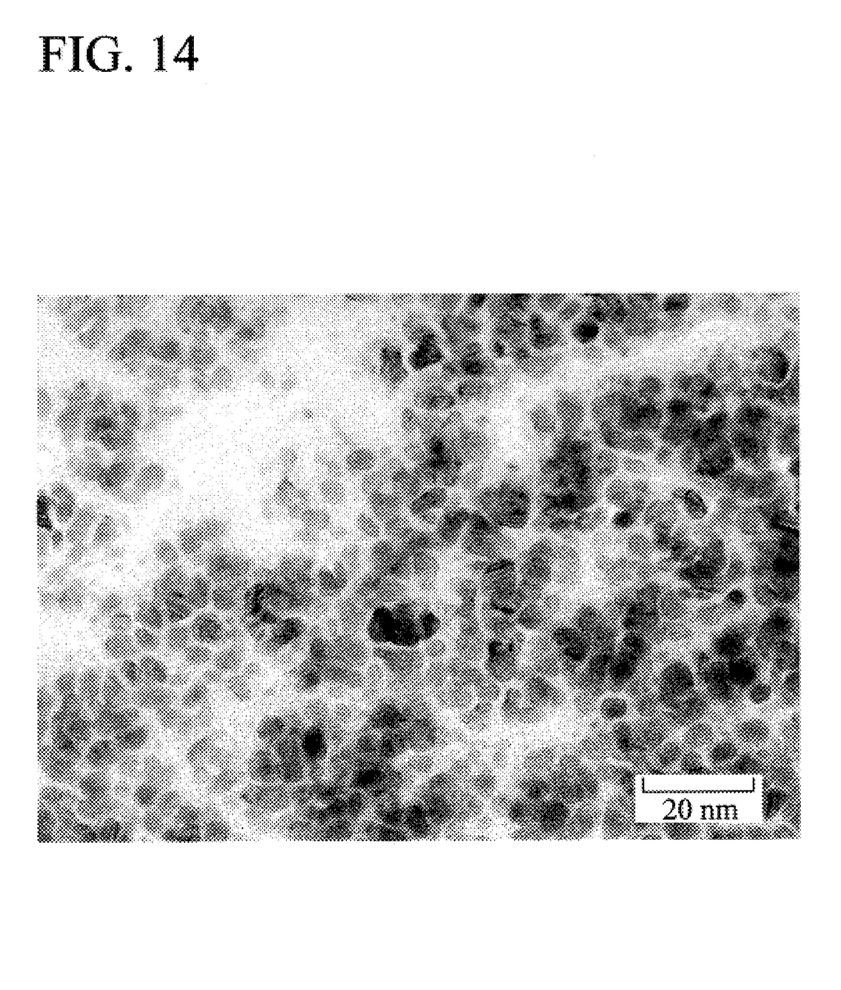
FIG. 14 is a TEM micrograph showing an example of magnetic layer of the present invention.

Furthermore, FIGS. 13 and 14 are transmission type electron microscope (TEM) micrographs of the magnetic layer shown in FIG. 10. These TEM micrographs (see FIG. 13) confirm that the apparently individual magnetic substances in the SEM micrograph are actually clusters formed of aggregated magnetic grains. The clusters have various shapes such as an elongated shape, but the average diameter was about 30 nm. Furthermore, the clusters were spaced apart from each other with an average gap of 3 nm (in a range of about 2.5 to 3.5 nm) when the gap is indicated by the shortest distance between adjacent clusters. Furthermore, each of the magnetic grains constituting the cluster had a grain diameter of about 8 to 10 nm (see FIG. 14).

Thus, it is believed that the fine magnetic grains constituted the clusters, and the clusters were spaced apart with a suitable gap, so that the magnetic recording medium was provided with good electromagnetic conversion characteristics. Then, a change in the structure of the magnetic layer was investigated by varying the Ar pressure for formation of the magnetic layer. As a result, when the Ar pressure was 30 mTorr, the average gap between the clusters was 1.5 nm. When the Ar pressure was 25 mTorr, the average gap between the clusters was 1 nm. When the Ar pressure was 75 mTorr, the average gap between the clusters was 5 nm. When the Ar pressure was 80 mTorr, the average gap between the clusters was 6 nm. Thus, the gap between the clusters increased as the Ar pressure was raised. In view of the relationship between the Ar pressure and the electromagnetic conversion characteristics as described earlier, the average gap between the clusters is preferably 1.5 nm to 5 nm.

Next, as shown in FIG. 4, a magnetic layer having a multi-layered structure comprising two magnetic thin films 11 and a non-magnetic thin film 12 (Cr layer) between the magnetic thin films 11 was formed, and the characteristics thereof were compared with those of a single-layered magnetic layer. In the magnetic layer having a multi-layered structure, as in the case of the single layer, the saturation magnetization (Ms δ) was about 1 memu/cm². As a result, it was confirmed that the medium noise was lower than that of the single-layered magnetic layer, and the S/N ratio was improved by about 1 to 2 dB.

Next, magnetic disks were produced by using glass substrates with various surface roughnesses (Ra) by the same method as above. Table 1 shows the results.

TABLE 1

| Substrate Surface Roughness (Ra) (nm) | S/N ratio (dB) | Head Adhesion |
| --- | --- | --- |
| 0.6 | +1.2 | Adhesion |
| 1.0 | +0.5 | No Adhesion |
| 1.3 | +0.3 | No Adhesion |
| 1.6 | 0 | No Adhesion |
| 2.0 | −1.0 | No Adhesion |
| 2.4 | −1.6 | No Adhesion |

As shown in Table 1, in the disk having a surface roughness (Ra) of 0.6 nm, head adhesion occurred so that it was necessary to take a countermeasure such as zone texture. On the other hand, when the substrates having Ra of 1.0 to 1.6 nm were used, there was no substantial problem if the above-described magnetic layer was used, although the S/N ratio deteriorated slightly. However, when the substrate having Ra more than 1.6 nm was used, the S/N ratio deteriorated significantly so that the magnetic recording medium with this substrate was not suitable for high density recording. Thus, when the glass substrates having a surface roughness (Ra) of 1.0 to 1.6 nm are used, a recording medium suitable for high density recording can be obtained without performing zone texture.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. A magnetic recording medium comprising a non-magnetic substrate, an underlying layer formed on the non-magnetic substrate, and a magnetic layer formed on the underlying layer, wherein the magnetic layer includes clusters, each of which is formed of aggregated magnetic grains, each magnetic grain having a grain diameter of 5 nm to 20 nm, and a non-magnetic substance between the clusters, and an average gap between the clusters is 1.5 nm to 5 nm.

2. The magnetic recording medium according to claim 1, wherein the non-magnetic substance comprises at least one metal compound selected from the group consisting of silicon oxide, aluminum oxide, cobalt oxide, titanium oxide, chromium oxide, magnesium oxide, tantalum oxide, silicon nitride, aluminum nitride, titanium nitride and chromium nitride.

3. The magnetic recording medium according to claim 1, wherein in the magnetic layer, an amount of a metal component included in a metal compound constituting the non-magnetic substance is 5 to 12.5 at. % with respect to a total amount of the metal component and a metal component constituting magnetic grains.

4. The magnetic recording medium according to claim 1, wherein a surface roughness of the non-magnetic substrate is in a range from 1 nm to 1.6 nm.

5. The magnetic recording medium according to claim 1, wherein the underlying layer is a layer selected from a Cr layer and a Cr alloy layer.

6. The magnetic recording medium according to claim 1, wherein a thickness of the magnetic layer is 20 nm or less.

7. The magnetic recording medium according to claim 1, wherein the magnetic layer is a multilayer comprising a magnetic thin film including the clusters and the non-magnetic substance, and a non-magnetic thin film.

8. A method for producing a magnetic recording medium, comprising forming an underlying layer on a non-magnetic substrate and forming a magnetic layer comprising clusters, each of which are formed of aggregated magnetic grains, on the underlying layer, wherein the magnetic layer comprising clusters is formed by simultaneously sputtering a magnetic substance and a non-magnetic substance in an atmosphere having a pressure of 30 mTorr to 75 mTorr, and the non-magnetic substance does not form a solid solution with the magnetic substance.

9. The method for producing a magnetic recording medium according to claim 8, wherein the magnetic layer is formed at a substrate temperature of 200° C. or less.

10. The method for producing a magnetic recording medium according to claim 8, wherein the non-magnetic substance comprises at least one metal compound selected from the group consisting of silicon oxide, aluminum oxide, cobalt oxide, titanium oxide, chromium oxide, magnesium oxide, tantalum oxide, silicon nitride, aluminum nitride, titanium nitride and chromium nitride.

11. The method for producing a magnetic recording medium according to claim 8, wherein in the magnetic layer, an amount of a metal component included in a metal compound constituting the non-magnetic substance is 5 to 12.5 at. % with respect to a total amount of the metal component and a metal component constituting magnetic grains.

12. The method for producing a magnetic recording medium according to claim 8, wherein a surface roughness of the non-magnetic substrate is in a range from 1 nm to 1.6 nm.

13. The method for producing a magnetic recording medium according to claim 8, wherein the underlying layer is a layer selected from a Cr layer and a Cr alloy layer.

14. The method for producing a magnetic recording medium according to claim 8, wherein a thickness of the magnetic layer is 20 nm or less.

15. The method for producing a magnetic recording medium according to claim 8, wherein the magnetic layer is a multilayer comprising a magnetic thin film including the clusters and the non-magnetic substance, and a non-magnetic thin film.

16. The method for producing a magnetic recording medium according to claim 8, wherein the clusters are formed of aggregated magnetic grains, each magnetic grain having a grain diameter of 5 nm to 20 nm, wherein an average gap between clusters is 1.5 nm to 5 nm.

* * * * *